Nov. 7, 1933. C. WHITE 1,934,289
METHOD OF HANDLING FREIGHT AND APPARATUS THEREFOR
Filed March 1, 1932
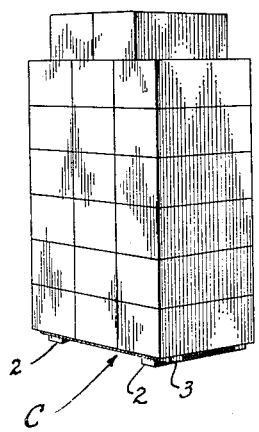
Fig. 1.
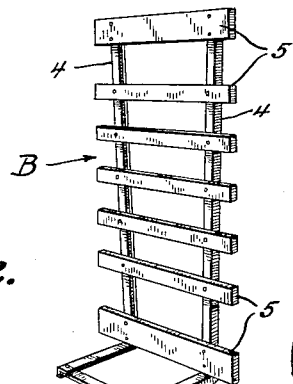
Fig. 2.
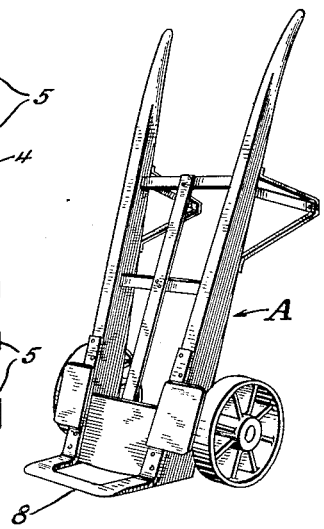
Fig. 3. Fig. 4.
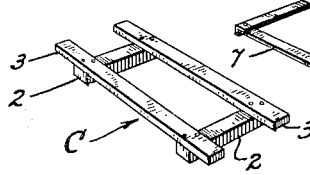
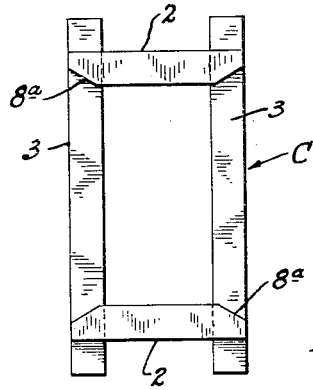
Fig. 8.
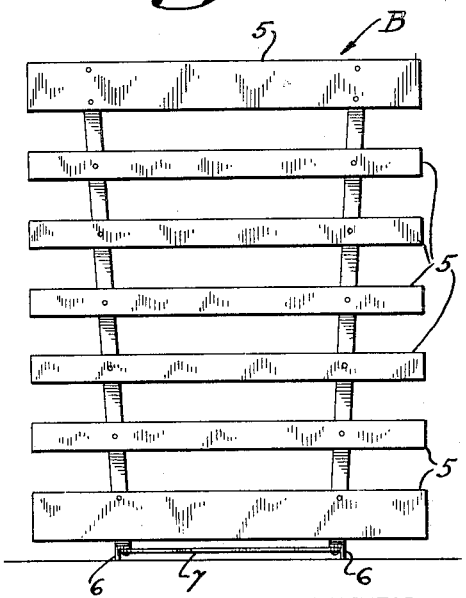
Fig. 6. Fig. 5.
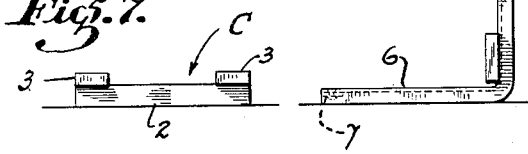
Fig. 7.
INVENTOR.
Charles White.
BY Townsend & Loftus
ATTORNEYS.

Patented Nov. 7, 1933

1,934,289

UNITED STATES PATENT OFFICE 1,934,289

METHOD OF HANDLING FREIGHT AND APPARATUS THEREFOR

Charles White, San Francisco, Calif.

Application March 1, 1932. Serial No. 595,998

2 Claims. (Cl. 214—65)

This invention relates to a method of handling freight and apparatus therefor.

Freight or goods transported by public carriers, or otherwise, are as a rule loaded and unloaded a number of times with danger of damage to the goods. For instance, freight delivered to a dock or warehouse is unloaded from the trucks or vehicles delivering the same and stacked in piles. Later on the freight is loaded on hand trucks and moved to railway cars, ships, etc., where the freight is re-piled or stacked for shipment and when the destination is reached the freight is again loaded on trucks and moved by the trucks to warehouses where the freight is re-piled and later removed for delivery to its final destination. Where packaged goods, such as small boxes, cartons, etc., are being handled, considerable time is lost in loading and unloading, stacking, etc., as each individual package must be handled one at a time. In fact, it is this continuous re-handling of goods that causes damage to the same and it forms one of the main cost items in freight transportation.

The object of the present invention is to provide a method of handling freight and to provide a simple form of apparatus therefor, and particularly to provide a method and apparatus whereby freight such as packaged goods and the like may be transported with practically no re-handling.

The apparatus employed is shown by way of illustration in the accompanying drawing, in which—

Fig. 1 shows a load of cartons or boxes in stacked position on a flat.

Fig. 2 is a perspective view of the flat upon which the freight or goods are loaded.

Fig. 3 is a perspective view of a detachable rack which is used when moving a load of goods from one place to another.

Fig. 4 is a perspective view of a standard form of hand truck employed in moving a load of goods from one place to another.

Fig. 5 is a side elevation of the rack.

Fig. 6 is a front view of the rack.

Fig. 7 is an end view of the flat.

Fig. 8 is a bottom view of the flat.

Referring to the drawing in detail, it may be stated that the only apparatus employed in handling freight by the method herein to be disclosed is a standard form of hand truck, such as indicated at A in Fig. 4, a detachable rack generally indicated at B in Fig. 3, and an unloading flat generally indicated at C in Fig. 2.

The flats consist of a pair of interspaced base cleats 2—2 secured with relation to each other by two or more longitudinally extending slats 3—3. The packaged goods or freight to be handled is loaded on the flat, as shown in Fig. 1, and a considerable number of flats will accordingly be required as a load once placed thereon will remain on the flat until the final destination is reached. The detachable rack employed consists of a pair of interspaced angle bars 4—4 secured with relation to each other by means of cross slats 5. The lower ends of the angle bars are turned at right angles, as shown at 6, to form foot extensions which are tied together by cross bars 7.

In actual practice the handling of freight during transportation is accomplished as follows: Whenever a truck or like vehicle loaded with freight arrives at a warehouse, the freight is unloaded and placed directly on flats, such as shown at C in Figs. 1 and 2. Whenever the load is ready to be moved the rack 3 is placed in position by slipping the foot extension 6 in under the flat between the cleats 2. The lifting blade 8 of the truck is then moved into position beneath the load and the load as a whole is tipped by the truck and is supported in tipped position by the cross slats 5 of the rack. The load may thus be moved from place to place, for instance, from the warehouse to a freight car or ship and it is there unloaded, the load remaining on the flats while the rack is removed and placed on the hand truck to be used over and over again; the rack merely serving the function of facilitating the handling of the load while moving the same from place to place. When the load arrives at its destination, it is again removed to the warehouse by means of the hand truck and the rack and will remain there until it is ready for delivery to its final destination, hence handling of the goods during transportation has been entirely eliminated; the only time the individual packages forming the load are handled being that time when they are first loaded on the flats and the second time when they are unloaded for final delivery. During the entire period of transportation the load remains intact on the flat and is in no way handled except to be bodily moved from place to place by means of the rack B and the hand truck A.

The apparatus, as previously stated, is intended for use with a standard form of hand truck. The apparatus serves several important functions: First, as a support to receive and support a load until it reaches its final destination; secondly, the apparatus facilitates placing the load on a hand truck when a load is to be moved from place to place; third, the apparatus eliminates handling of the individual packages forming the load until the final destination is reached; fourth, the flats and racks employed may be of any size desired and as such will permit the handling of a maximum load of bulky or light packages otherwise impossible to handle on an ordinary truck; fifth, the apparatus protects the load from damage in warehouses where the floors are damp or dirty, as the load is at all times supported by the flats and as such does not contact with the damp or dirty floors; sixth, a very material saving in time is obtained due to the elimination of re-handling of individual packages when unloading and loading the hand trucks, hence materially reducing cost of transportation; seventh, the danger of damage to the goods due to the elimination of re-handling is very materially reduced; and eighth, the flats and racks employed may be made of exceedingly light material, thus eliminating handling of unnecessary weight, particularly when the trucks are returning empty.

By the way, it should be noted by referring to Figs. 5 and 7, that the angle bars 6 forming the foot extension of the rack have a vertical height slightly less than the cleats 2 forming a part of the flats. This is fairly important as it permits ready insertion of the foot extension 6 beneath the flat. It should furthermore be noted, by referring to Fig. 8, that the ends of the cleats 2 are beveled, as shown at 8a, so as to guide the foot extension 6 inwardly between the cleats when placing the rack in position. Ample space is accordingly provided beneath each flat to permit ready insertion of the foot extension of the rack, the vertical height of the angle bars forming the foot extension 6 and being at the same time sufficient to permit ample space for the insertion of the lifting blade 8 of the hand truck when this is moved into position beneath the load to lift and move the same.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In the handling and storing of material on a floor having a flat upper supporting surface that is unobstructed in the immediate region where and when the material to be stored is being placed and when the stored material is removed, a flat and a rack which are separate from a hand truck but which are employed in operative combination in conjunction with a hand truck having a lifting blade at the lower forward end of the truck, which lifting blade is employed in the supporting of the rack and therethrough the flat during the transporting of material to and from its place of storage and upon which flat the material is supported during the period of transporting to storage, during the storage and during the transporting from storage, said flat having a supporting surface provided on and by transversely extending cross slats to which there are secured longitudinally extending supporting cleats that rest directly upon the flat floor surface when supporting a load of material stored thereupon, the end portions of the cleats being bevelled on their inner sides so as to provide inwardly extending guide portions below the slats and between the cleats, said rack having transversely spaced angle bars providing side members that extend upwardly and foot extensions that extend forwardly from the lower ends of the side members and at right angles thereto, said side members being connected by vertically arranged cross slats and the forward ends of the foot extensions being tied together by a cross bar that is within the confines provided by said foot extensions and which is below the top surface of said foot extensions and above the lower bounds of said foot extensions, said foot extensions also having the vertical dimensions thereof less than the vertical dimensions of the longitudinally extending cleats of said flat and over all transverse dimensions less than the transverse dimensions between said cleats, the foot extensions of the rack being transversely spaced a greater distance than the over all transverse dimensions of the lifting blade of the truck and also having sufficient vertical dimensions to permit the ready insertion of the lifting blade into the space below the upper surface of said foot extensions.

2. In the handling and storing of material on a floor having an unobstructed flat upper supporting surface for a storage section thereof, a flat and a rack that are employed in operating combination in conjunction with a hand truck but which are members independent of the hand truck, which said hand truck has a lifting blade at the lower forward end thereof and which is employed in the supporting of the rack and thereby the flat during the transporting of material to and from its place of storage, said flat having a supporting surface provided in and by transversely extending cross slats to which there are secured longitudinally extending supporting cleats that rest directly upon said flat floor surface when supporting a load of material stored upon the flat, said rack having transversely spaced angle members providing side members that extend upwardly and foot extensions that extend forwardly from the lower ends of the side members and at right angles thereto, said side members being connected by cross slats, said foot extensions having the vertical dimensions thereof less than the vertical dimensions of the longitudinally extending cleats of said flat and over all transverse dimensions less than the transverse dimensions between said cleats, the transversely spaced angle members of the rack being transversely spaced a greater distance than the over all transverse dimension of the lifting blade of the truck and also having sufficient vertical dimensions to permit the ready insertion of the lifting blade into the space below the upper surface of said foot extensions.

CHARLES WHITE.